Nov. 16, 1971   F. PASSARO ET AL   3,619,964
FLOORING PANELS
Filed Dec. 10, 1969   2 Sheets-Sheet 2
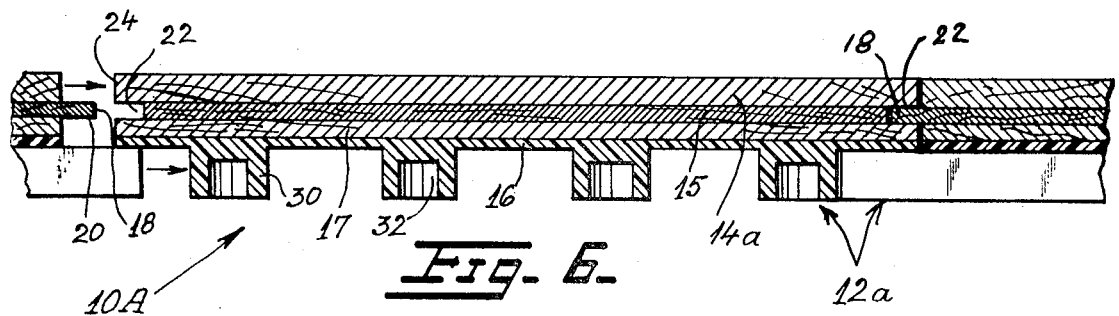
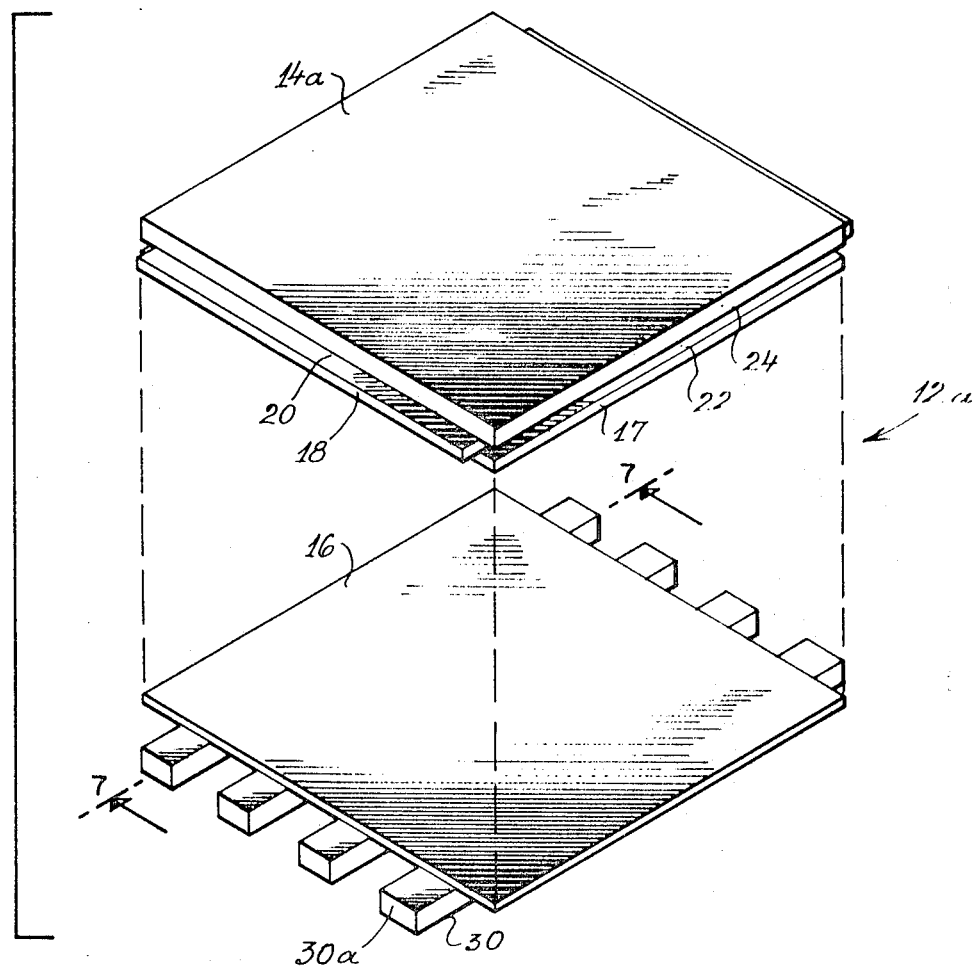
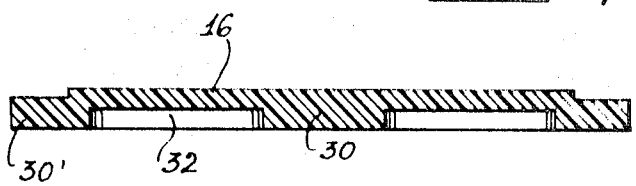
LEO MONDRY
NED ROSS &
FRANK PASSARO
INVENTORS
Polachek & Saulsbury
ATTORNEYS United States Patent Office 3,619,964
Patented Nov. 16, 1971

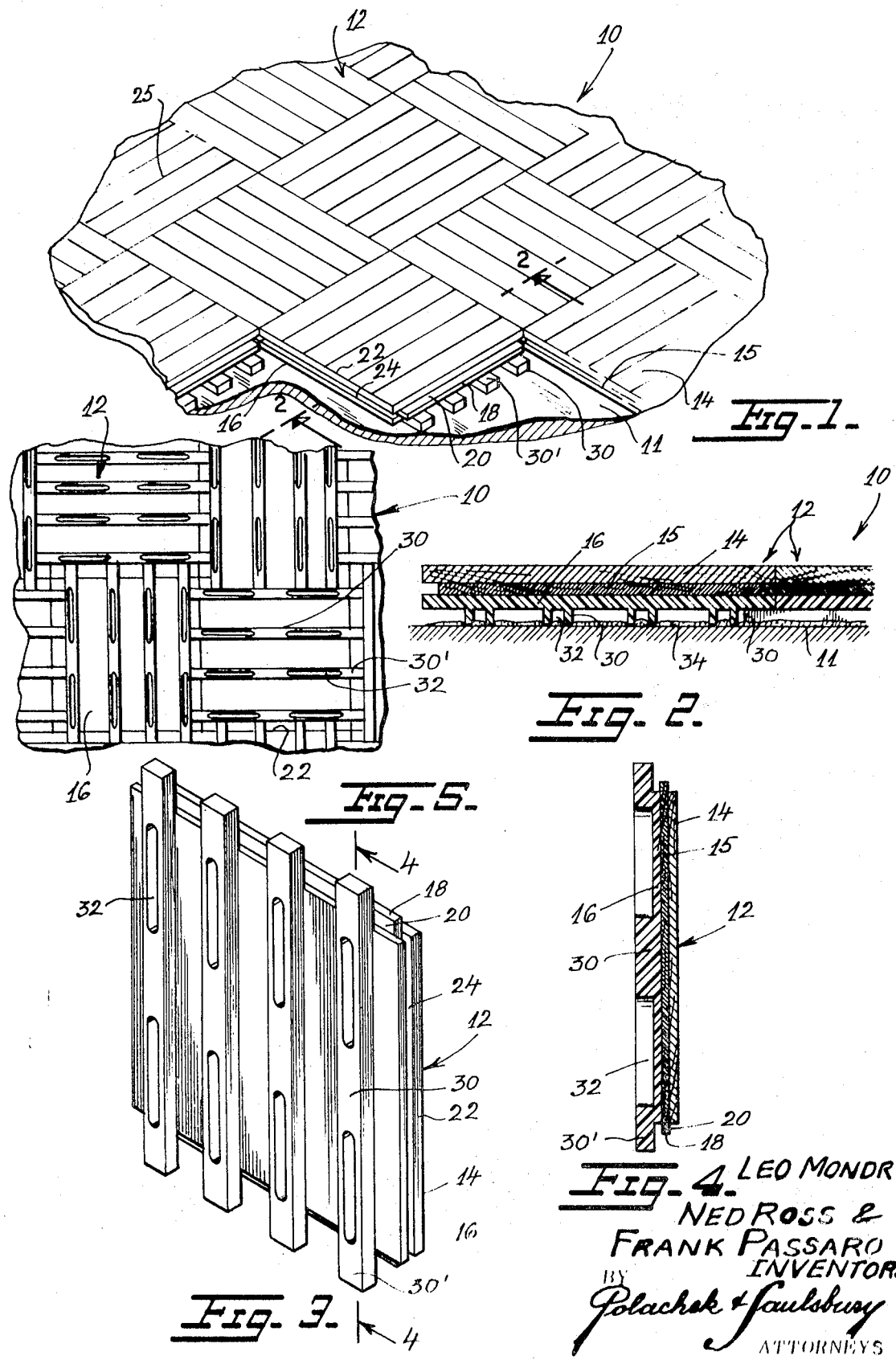

3,619,964
FLOORING PANELS
Frank Passaro, 23—54 E. 5th St. 11218; Ned Ross, 259 E. 52nd St. 11203; and Leo Mondry, 501 New York Ave. 11225, all of Brooklyn, N.Y.
Filed Dec. 10, 1969, Ser. No. 883,828
Int. Cl. E04f *13/08*
U.S. Cl. 52—309   8 Claims

ABSTRACT OF THE DISCLOSURE

Laminated flooring panels are formed of a plurality of upper layers of plywood and a bottom layer made of synthetic plastic material. Integrally formed with the plastic bottom layer are cross bars which elevate the layers above a subfloor. The bars are spaced apart and underlap adjacent panels. The panels are secured to the subfloor by cement. The bars have longitudinal grooves into which the cement enters for improving the attachment to the subfloor. Air spaces under the panels improve sound absorption thermal insulation, and moisture resistance of the panels.

---

This invention relates to the art of flooring construction, and more particularly concerns flooring panels having an improved laminated structure.

It has been known heretofore to make flooring panels of plywood laminations. The present invention is directed at providing laminated floor panels which have a bottom layer made of nonporous, moistureproof, tough plastic material. Integral with the plastic layer are slotted or grooved spaced bars or ridges to elevate the panels above the subfloor. These panels have the following desirable qualities:

(1) The panels resist breakage, cracking, and splitting better than prior laminated panels.
(2) The panels are stronger than prior floor panels.
(3) The panels are secured to the subfloor by cement without use of nails.
(4) The panels provide improved sound absorption over prior panels.
(5) The panels provide better thermal insulation than prior panels.
(6) The panels remain drier and resist warping and mold better than prior panels.
(7) The panels are more comfortable to walk and stand on due to better shock absorbing qualities.
(8) The panels interfit better due to underlapping of the elevating bars, so that separating at the seams is resisted more than in prior panels.
(9) The panels are more economical to manufacture since thinner wood layers can be used, and less wood layers are required.
(10) The panels are easier to install in assembling a parquet floor than prior flooring panels.

Other and further objects and advantages of the invention will become apparent from the following detailed description, taken together with the drawing, wherein:

FIG. 1 is a fragmentary perspective view of an assembled parquet floor made of laminated panels according to the invention.

FIG. 2 is an enlarged cross sectional view taken on line 2—2 of FIG. 1.

FIG. 3 is an isometric view of a single laminated panel in an upright position.

FIG. 4 is a vertical sectional view taken on line 4—4 of FIG. 3.

FIG. 5 is a bottom plan view of a portion of the assembled floor of FIG. 1, with subfloor omitted to show the interfitted laminated panels.

FIG. 6 is a further enlarged sectional view similar to FIG. 2, showing another panel construction.

FIG. 7 is an exploded perspective view of parts of a panel shown in FIG. 6.

FIG. 8 is a cross sectional view taken on line 8—8 of FIG. 7, through the bottom plastic layer.

Referring first to FIGS. 1, 2 and 3 there is shown a flat floor assembly 10 comprising a plurality of laminated panels 12 interfitted and mounted on a subfloor 11. Each panel is made of a plurality of layers or laminations 14, 15 and 16. The two upper layers 14 and 15 are made preferably of plywood or wood composition material. The bottom layer 16 is made of moistureproof, nonporous, tough plastic material. This plastic material may be an acrylic, phenolic or other suitable synthetic resin. The panels are rectangular and preferably square in plan view. The center layer 15 extends outwardly beyond the upper and lower layers at opposite edges 18 to define tongues 20. Layer 15 is shorter than the upper and lower layers at opposite edges 22 to define grooves 24. These grooves receive the tongues 20 of adjacent panels. The panels are assembled in interfitting relationship by orienting adjacent panels perpendicular to each other in the planes of the panels. Lines 25 on the upper layer 14 of each panel may be shallow grooves cut or pressed in the top surface to simulate an assembly of narrow wood strips.

Integral with the bottom layer 16 of each panel as shown in each of FIGS. 1–5 is a plurality of parallel bars 30. The bars are spaced apart laterally and extend at opposite ends beyond the tongues 20 at edges 18. The projecting ends 30' of the bars underlay and extend inwardly of grooved edges 22 of adjacent panels. Longitudinally extending grooves 32 are formed in each bar. The thickness of the bars 30 is preferably about equal to that of the two upper layers 14, 15 as best shown in FIG. 4.

A suitable cement 34 interposed between the undersides of the bars and subfloor 11. The cement surrounds the bars at the sides and enters the grooves 32. The panels are thus held in interfitting, abutted relationship to the subfloor. A saving in cement is effected over prior flooring installations where cement covers the entire bottom surfaces of the panels. It will be noted that layer 16 is a moistureproof barrier interposed between the subfloor and the overlaying layers 14, 15. Layer 16 serves to keep the upper layers dry so that they resist warping. The tough, resilient plastic layer 16 also reinforces the structure, strengthening it, absorbing sound, and providing thermal insulation so that the temperature of the upper layers can be as much as 20° F. different, cooler or warmer than that of the subfloor 11. The air spaces S between the bottom plastic layer 16 and the subfloor 11 further improve sound absorption and thermal insulation. The bars 30 act as resilient supports.

The several layers 14, 15 and 16 are attached together by bonding them with thermosetting adhesive by methods well known in the plywood manufacturing art. Each panel forms a rigid structure. The entire floor 10 forms a unitary structure. The tongue and groove assemblies at the seams or edges of the adjacent panels are reinforced and supported by the underlapping ends extending 30' of bars 30. It will be noted in FIGS. 2 and 5 that the 30' of the bars of each panel extend up to side of the outermost bar of the adjacent panel. This further reinforces the interfitting of the tongues and grooves and prevents opening of the seams.

The floor 10 can be laid quickly at relatively low cost. Skill heretofore required in nailing parquet flooring or in cementing entire panels is avoided here.

FIGS. 6, 7 and 8 show panels 12a used in assembling floor 10A. Here each panel has an additional wood lamination or layer 17 interposed between plastic layer 16 and layer 15. This construction has the desirable feature that the tongues 20 interfit in grooves 22 between two wood layers instead of one wood layer and one plastic layer as in panels 12. All layers 14a, 15, 16 and 17 are bonded to each other to form a unitary structure. Other parts corresponding to those of panels 12 are identically numbered. Assembly and interfitting of panels 12a is the same as described for panels 12. The desirable properties of the panels listed above apply to both panel structures. Layer 14a is shown without the lines 25 shown in FIG. 1, but these lines can be provided if desired.

The panels 12 and 12a can be manufactured at low cost by mass production plywood and plastic fabricating machinery.

What is claimed is:

1. A floor panel comprising rectangular top, intermediate and bottom layers bonded together face-to-face to form a unitary structure; and a plurality of spaced bars integral with said bottom layer and extending parallel across and underneath said bottom layer and said bars being formed of tough, resilient, nonporous, moisture-proof material to serve as a moisture-proof barrier between said subfloor and the upper layers of said structure and to serve as sound absorbing and thermal insulation means, said intermediate layer has two opposite edge portions extending beyond registering edges of the top and bottom layers to define two tongues, said intermediate layer having two other opposite edge portions recessed within other registering edges of the top and bottom layer to define grooves, so that the tongues and grooves can interfit with grooves and tongues respectively of other similar panels to form a flat upper floor on said sub-floor.

2. A floor panel as defined in claim 1, wherein said bars have recesses formed therein for receiving and engaging cement to secure said structure to the subfloor.

3. A floor panel as defined in claim 1, wherein said bars extend outwardly of two opposite edges of said structure for underlaying edges of other similar panels abutted edgewise to said structure of said subfloor.

4. A floor panel as defined in claim 3, wherein said bars have recesses formed therein for receiving and engaging cement to secure said structure to the subfloor.

5. A floor panel as defined in claim 1, wherein said bars are long enough to extend up to lateral sides of other bars on said other panels to define air-filled spaces therebetween which serve as further sound absorbing and thermal insulation means under the bottom layer.

6. A floor panel as defined in claim 1, further comprising a fourth layer interposed between said bottom layer and said intermediate layer and having edges registering with edges of the bottom layer.

7. A floor panel as defined in claim 1, wherein the top layer has lines on its upper exposed side to simulate a plurality of strips abutted edgewise to each other.

8. A floor panel as defined in claim 1, wherein the top and intermediate layers are made of wood and wherein the bottom layer is made of a synthetic resin material.

References Cited

UNITED STATES PATENTS

| 1,637,567 | 8/1927 | Herrick | 52—391 |
| 1,661,037 | 2/1928 | Gammeter | 52—390 |
| 2,088,238 | 7/1937 | Greenway | 52—390 |
| 2,257,048 | 9/1941 | Fulbright | 52—589 |
| 2,737,693 | 3/1956 | Robbins | 52—384 |

FOREIGN PATENTS

| 1,087,971 | 1954 | France | 52—592 |
| 868,787 | 1953 | Germany | 52—548 O |
| 880,388 | 1961 | Great Britain | 52—403 |

JOHN E. MURTAGH, Primary Examiner

U.S. Cl. X.R.

52—314, 391, 393